July 10, 1956    J. P. GUERRA ET AL    2,753,696
AIR CONDITIONER FOR PASSENGER AUTOMOBILES
Filed March 7, 1955    4 Sheets-Sheet 1
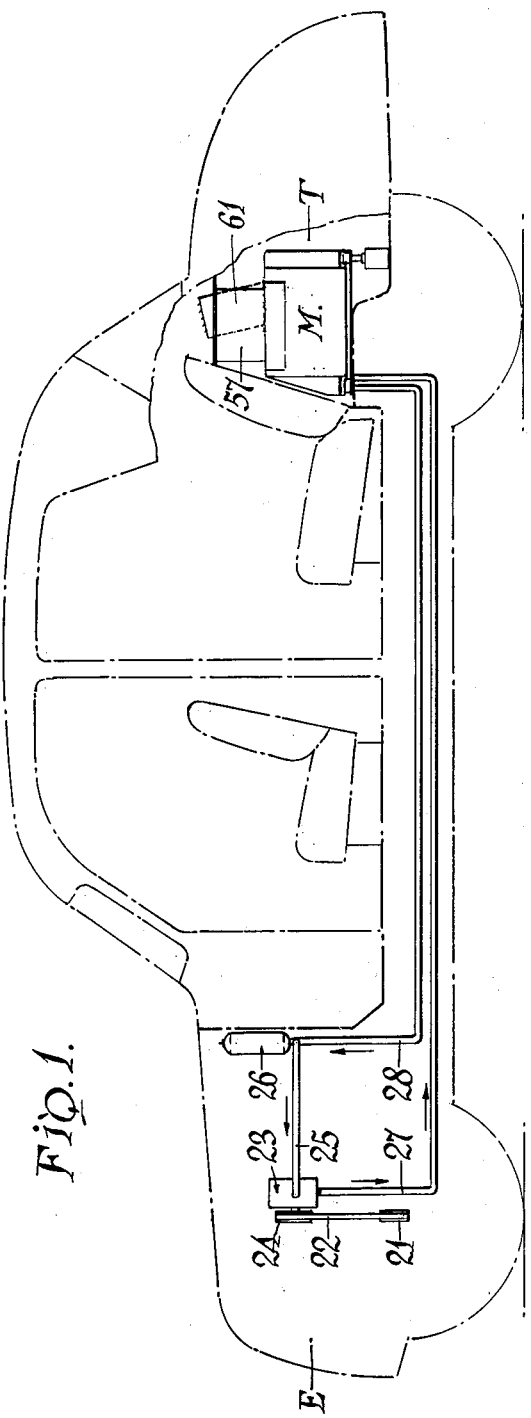
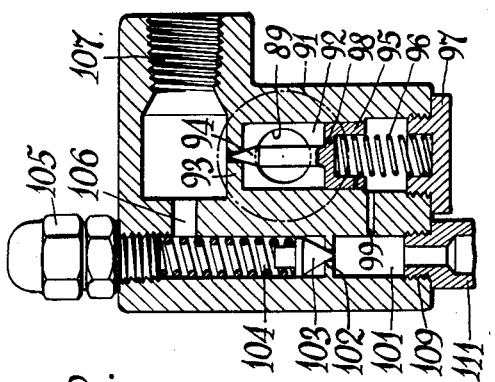
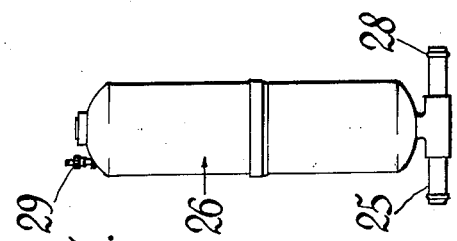
INVENTORS
John P. Guerra
BY Leslie R. Benemelis
& Leonard J. Sahs,
ATTORNEY.

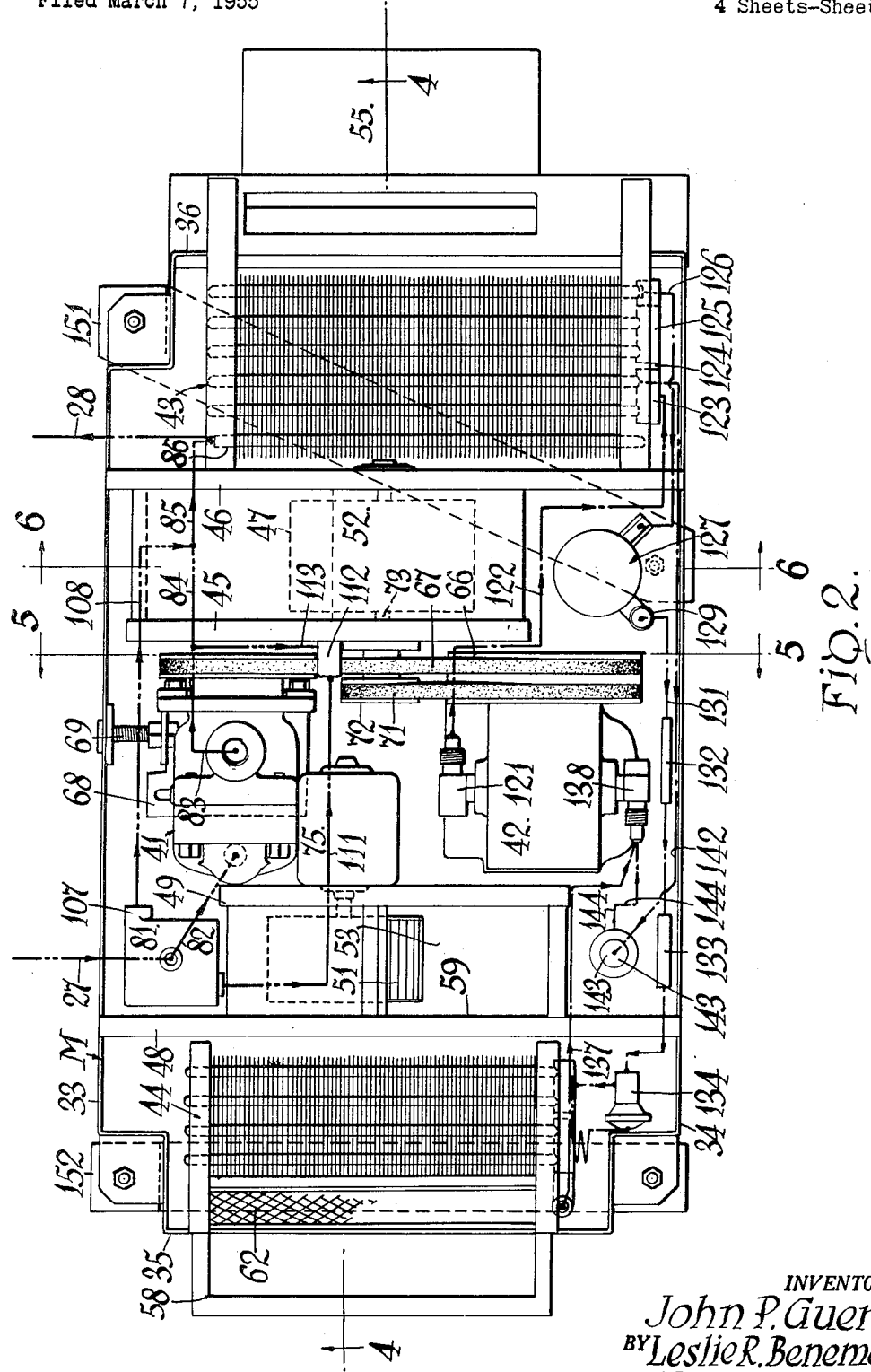

July 10, 1956
J. P. GUERRA ET AL
2,753,696
AIR CONDITIONER FOR PASSENGER AUTOMOBILES
Filed March 7, 1955
4 Sheets-Sheet 3
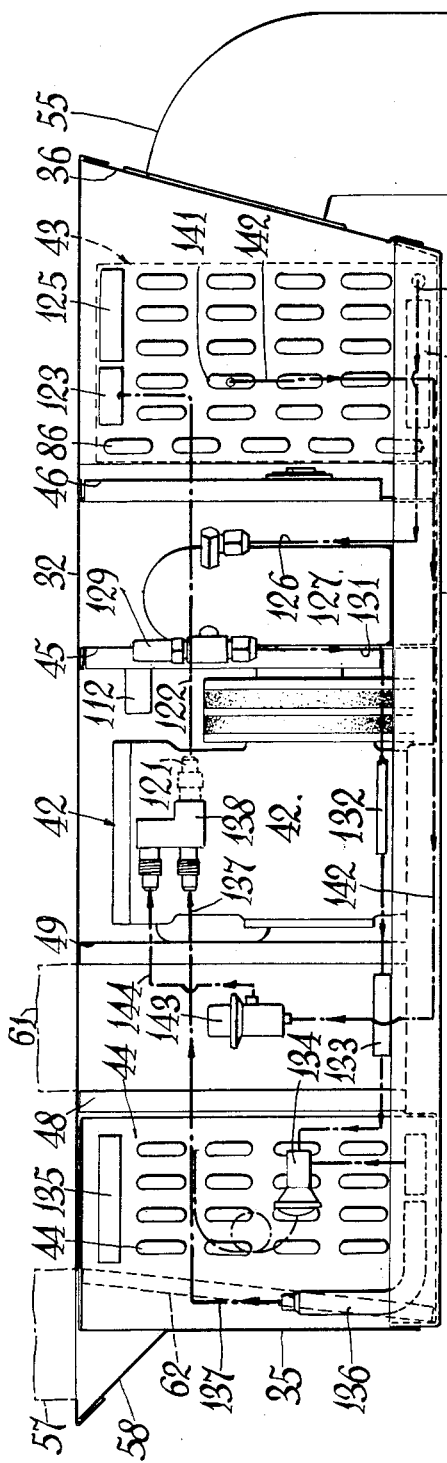
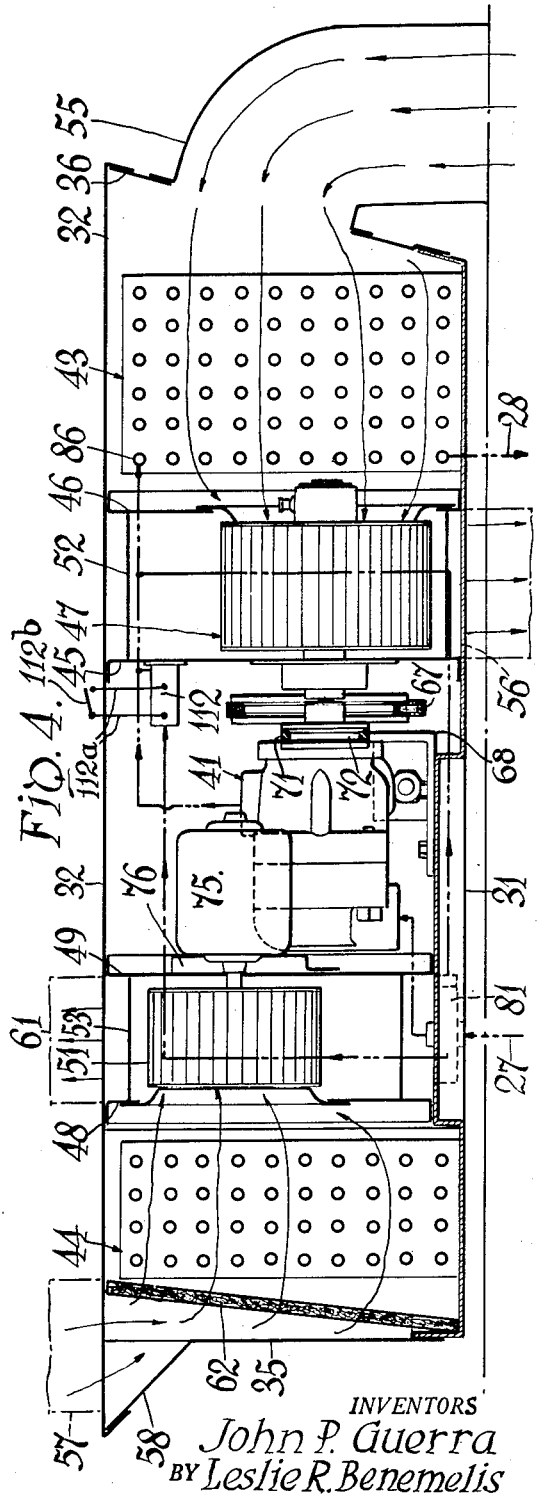
INVENTORS
John P. Guerra
BY Leslie R. Benemelis
& Leonard J. Sahs,
ATTORNEY.

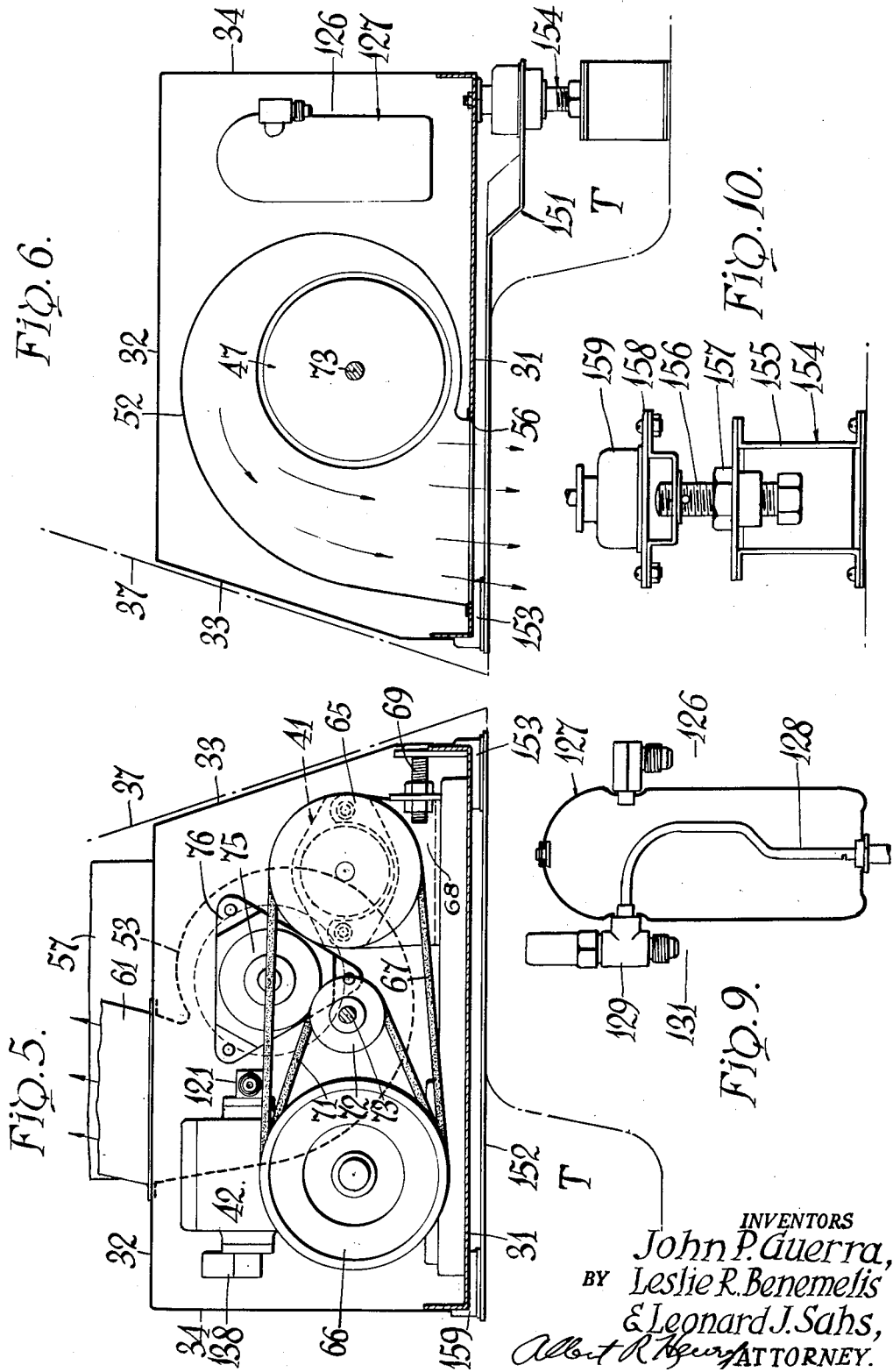

United States Patent Office 2,753,696
Patented July 10, 1956

2,753,696

AIR CONDITIONER FOR PASSENGER AUTOMOBILES

John P. Guerra, Buffalo, Leslie R. Benemelis, Tonawanda, and Leonard J. Sahs, Hamburg, N. Y., assignors to Fedders-Quigan Corporation, Buffalo, N. Y.

Application March 7, 1955, Serial No. 492,444

4 Claims. (Cl. 62—117.1)

This invention relates to air cooling or conditioning apparatus, and it has particular reference to the provision of a substantially self-contained refrigerating machine which may be installed in a motor vehicle, such, for example, as a passenger car, to circulate and cool the air therein for the comfort of the occupants.

The comfort cooling of passenger cars by mechanical refrigeration, although proposed many years ago, has continued to present perplexing problems, even to an industry which has effectively provided machines for the comfort cooling of residential and other rooms. One immediately apparent problem is that due to the limited amount of space available for the installation of a machine having sufficient capacity to fulfill its intended purpose.

Another problem is due to the variable speed of an automobile engine, the use of which has been repeatedly proposed as the prime mover for the refrigerant compressor. Inasmuch as the compressor should operate as nearly as possible at a constant speed, the provision of a satisfactory connecting drive has proved difficult. Other problems involve the proper circulation of air, and protection of the various components from premature failure from vibrations and the stresses to which a moving vehicle is subject. The matter of cost to the user is, of course, of very practical significance.

The present invention contributes to the solution of these and other problems by providing a substantially self-contained refrigeration machine, mounted in a casing of such size that it may be positioned in the customary trunk compartment of an automobile without occupying the entire space of practically all present day cars. Provision is made to induct outside air into the compartment for flow over a refrigerant and oil cooling condenser, with return of the air to the outside. Another air stream circulates air within the car over an evaporator for comfort cooling purposes. Instead of the usual direct connection between the automobile engine and the refrigerant compressor, the engine is employed to drive a hydraulic pump, which in turn operates a hydraulic motor for driving the compressor, these last two components being disposed in the casing, and thus adding to the compactness and self-contained feature of the invention.

By employing a known type of hydraulic pump, whose output varies inversely as the engine speed, it is possible to operate the compressor at a substantially constant speed throughout the range of usual engine speeds, and thus maintain the refrigerating effect substantially constant for any given set of atmospheric conditions. Various other features of the invention will become apparent as this description proceeds, reference being made to the accompanying drawings, wherein:

Fig. 1 is a generally schematic view of a passenger car with the present invention installed therein;

Fig. 2 is a top plan of the machine, parts of a top cover plate being removed for clarity of illustration, and the various fluid conduits being shown diagrammatically;

Fig. 3 is a rear elevation, or as would be viewed by one looking into the trunk of the car, parts of the enclosing casing again being omitted;

Fig. 4 is a section taken substantially on the line 4—4 of Fig. 2;

Figs. 5 and 6 are sections taken substantially on the correspondingly numbered lines in Fig. 2;

Fig. 7 is an elevation, on an enlarged scale, of a reservoir for hydraulic fluid, also shown in Fig. 1;

Fig. 8 is a detail of a relief and control valve for the hydraulic fluid;

Fig. 9 is a section through a refrigerant receiver; and

Fig. 10 is an enlarged detail of a mounting bracket.

Referring to Fig. 1, an automoblie of conventional style, and indicated generally by the broken lines, includes an engine compartment E at the front and what is commonly called a trunk compartment T at the rear. The engine drives a pulley 21, such as the fan pulley, and a belt or chain 22 extending from such pulley drives an oil pump 23 through a pump pulley 24. The pump 23 receives a supply of hydraulic fluid through a suction line 25 from an oil reservoir 26, and the pump effluent is delivered to the rear of the automoblie through a discharge line 27, which may be of flexible tubing. Disposed within the rear compartment is an air cooling and conditioning machine M, to which the pump discharge is delivered in a manner about to be described. This oil, after performing its functions, flows through a line 28 back to the reservoir 26, thus completing its circuit. The reservoir 26 is provided with an air valve 29, so that a cushion of compressed air may be impressed over the oil contained in the reservoir, to minimize surges and pulsations and possible cavitation, and render the hydraulic action uniform at all times.

The air conditioning machine M is enclosed in a sheet metal casing fabricated in conventional manner to provide bottom and top walls 31 and 32, front and back walls 33 and 34, and end walls 35 and 36, respectively. In accordance with accepted drafting practice, these walls, which are formed of light gauge metal, are illustrated by single black lines. For the particular automobile in which the instant machine has been installed, the front wall 33 is sloped to conform generally to the contour of the car body panel 37, shown in Figs. 5 and 6 in broken line. Portions of some of these walls are open or perforated to admit air flow into the casing, as will be noted again at an appropriate part of this description.

Within the casing are the components of the refrigerating machine, some of which may be identified as follows: A hydraulically driven motor 41 is positioned about centrally of the casing adjacent the front wall 33, to operate a refrigerant compressor 42, located adjacent the back wall 34. On the right hand side of the casing is a combined oil cooler and refrigerant condenser, generally designated by the numeral 43, while on the left hand side is a refrigerant evaporator, generally designated by the reference numeral 44. The casing is internally divided on the right hand side by spaced walls 45 and 46 adjacent the condenser 43, which provide a housing for a blower 47. Another pair of transverse walls 48 and 49, to the left of the motor 41 and compressor 42, isolate the evaporator 44 from the remainder of the casing, and provide a housing for a second blower 51. The two blower housings are completed by scroll shaped walls 52 and 53, respectively.

Outside air is drawn by the blower 47 through the condenser 43 through a downwardly depending duct 55 attached to the side wall 36, and extending into an opening cut in the bottom of the car body. This air stream is discharged through an opening 56 in the bottom wall 31 for return to the outside through the car body. Air within the car body is recirculated over the evaporator 44, being inducted by the blower 51 through a duct 57

(Figs. 1 and 4), which extends from an opening cut in the shelf behind the back seat to an open top extension 58 on the end wall 35. The air is discharged from the casing of the blower 51 through an opening 59 at the top thereof into a duct 61 which also extends through the car shelf. These ducts may be provided with louvers, to direct the air flow, as will be readily understood. The air entering the evaporator initially flows through a removable filter 62, so that only clean air is returned to the passenger space.

A driving connection between the hydraulic motor 41 and the compressor 42 is effected by pulleys 65 and 66 and a belt 67. The motor 41 is slidably mounted on a slotted base plate 68, so that it may be adjusted to impart the correct tension in the belt 67, and a screw and nut connection 69 retains the motor in its proper position. The pulley 66 has two sheaves, the second of which receives a belt 71 passing over a smaller pulley 72, mounted on the shaft 73 of the condenser fan 47, and thus providing a drive therefor. The evaporator fan 51 is driven by an electric motor 75, mounted on a bracket 76 secured to the wall 49, as best shown in Fig. 5. In order to maintain the motor at suitable temperature, openings, not shown, are provided in one or more of the casing walls, between the internal bulkheads 45 and 49, so that the condenser fan 47 can draw an air stream through the central or machine compartment. The shaft of the electric motor 75 may be sealed where it passes through the bulkhead wall 49, so that this last mentioned unfiltered air stream will not be drawn into the car body, and fans 47 and 51 cannot have a tendency to oppose each other in their demands for air. The motor 75 may be operated by the car battery, either under manual or automatic control, in any known manner.

It was mentioned heretofore that the hydraulic pump 23 is of a type wherein increase in speed is accompanied by decrease in volumetric output, this result being obtained by mechanism known in the art and forming no part of the present invention. It may be noted in this connection that the pump employed in the illustrated embodiment of the invention was found to maintain the speed of the hydraulic motor 41 substantially constant over the normal range of engine speeds between one and four thousand R. P. M., which means, of course, that the speed of the compressor 42 is also substantially constant for most operating conditions, a result greatly to be desired.

The piping connections for both the hydraulic and refrigeration circuits are shown by single lines to avoid confusion, the hydraulic circuit being shown with a dash and double dot line (— . . —) and the refrigeration circuit by a dash and single dot line (— . —). Hydraulic fluid delivered by the pump 23 to the line 27 enters the casing to flow through a relief valve 81, and flows from the relief valve through a line 82 to the inlet side of the motor 41. The discharge from the motor 41 flows through series-connected lines 83, 84, and 85 to the serpentine tube 86 constituting one row of the finned condenser assembly 43. After flowing through this row, where the hydraulic fluid is cooled by the outside air stream, the oil is returned to the reservoir 26 through the line 28, which is connected to the opposite end of the tube 86. This is the normal oil circuit when full refrigeration effect is being obtained.

The relief valve 81 is shown in principle in Fig. 8 to facilitate a further description of the operation. The valve body is formed with a transverse duct 89 from face to face, the discharge port 91 to which the line 82 is connected being shown in dot and dash lines, while the inlet port to which the line 27 is connected is not visible as it is above the plane of the section. A valve cylinder 92 extends from one end of the body to a seat 93, and the cylinder contains valve stem 94 connected to a piston 95, urged by a spring 96 to seating position. The cylinder 92 is closed by a plug 97. Hydraulic fluid flowing through the valve body for discharge through the port 91 can leak through a bleed port 98 in the piston 95, thereby equalizing fluid pressures on either side of the piston, so that the spring 96, which is a rather light spring, can retain the stem 94 upon its seat 93.

A duct 99 extends from the cylinder 92 to a parallel cylinder 101, in which is contained a valve seat 102, valve element 103, pressure spring 104, and end closure nut 105. A transverse passageway 106 extends from the closed end of the cylinder 101 past the opposite face of the valve seat 93 to an outlet port 107, to which is connected a by-pass line 108 (Fig. 2) terminating between the sections 84 and 85 of the return line 28. The spring 104 is a very strong spring, and considerable pressure must be built up in the cylinder 101 before the valve 103 can be forced from its seat. When this does occur, the reduction in pressure in the cylinder 101, by release of hydraulic fluid through the port 107, enables the higher pressure in the duct 89 to overcome the resistance of the light spring 96, thus opening valve port 93, and bypassing the motor 41. When the excess pressure condition has corrected itself, normal operation is resumed.

There is another outlet port 109 from the cylinder 101, and, as shown in Fig. 2, it is connected by a line 111 to one side of a solenoid valve 112, the other side of which is connected by a line 113 to the return lines 83, 84. Flow through this circuit will therefore reduce the pressure in the cylinder 101, causing the relief valve 81 to open and bypass the motor 41, irrespective of the actual working pressure. The solenoid valve 112 is of a conventional, normally closed type, and it may be opened through a conventional electric circuit, part of which is indicated by the wires 112a in Fig. 4, closed by a manual switch 112b, which may be located where it is conveniently accessible to the driver. When the system delivers more cooling effect than is desired, the valve 112 is opened by the manual control of the driver, thus bypassing the motor 41 and discontinuing the operation of the compressor 42.

Considering next the refrigeration circuits, a compressor discharge fitting 121 supplies refrigerant through a line 122 to a manifold 123 for two rows of the condenser 43, other manifolds 124 and 125 directing the refrigerant to the other rows, for emergence into a line 126 leading to a receiver 127. As shown in Fig. 9, the receiver is provided internally with a tube 128 extending to the bottom, so that only liquid refrigerant will be supplied to the outlet fitting 129. The refrigerant then flows through a line 131, strainer 132, and sight glass 133 into a thermostatic expansion valve 134, for distribution to the multi-row evaporator 44, which, as will be apparent from Fig. 3, is provided with manifolds 135 and 136. The refrigerant then flows through a suction line 137 to a double ported inlet fitting 138 of the compressor 42. The operation of this circuit is in the usual manner, and needs no amplification for those skilled in the art.

Under certain operating conditions, and when the car temperature is reduced to a rather low value, the lower surface temperature of the coils of the evaporator 44 may cause the moisture condensing on the coils to form frost. This is not a desirable working condition, and means are therefore provided to reduce the refrigerating effect, so that the evaporator may be defrosted by the air flowing thereover. Such frosting condition is accompanied by a lowering of the suction pressure of the volatilized refrigerant, and advantage is taken of this phenomenon to provide an automatic control.

One intermediate row 141 of the condenser 43 is tapped by a line 142 to a pressure responsive automatic valve 143, of the well known type in which by counterbalancing springs and diaphragms, a reduction in pressure in the gas flowing into the valve will enable the springs to open the valve. Suction pressure is constantly applied to the valve 143 by a line 144 leading from the valve body to one of the ports of the compressor inlet fitting 138. When the suction pressure in the line 137 drops to a value commensurate with danger of frosting the evaporator 44, the valve 143 will open, and refrigerant in the condenser 43 may therefore flow through the line 142 to the suction side of the compressor 42. The evaporator 44 is thus starved of its normal supply of refrigerant, and accordingly it can warm up. As the surface temperature rises, the suction pressure also increases, so that the valve 143 may close and restore the system to normal operation.

In order to adapt the machine to a variety of automobiles, the bottom wall 31 is supported on a pair of relatively heavy transversely disposed trusses 151 and 152, connected thereto at the inner side by resilient buttons 153. The illustrated trunk compartment T has a dropped bottom at the access end, and the rear end of the machine is supported on it by adjustable posts 154, each having a base member 155 receiving a screw 156 which can be locked in adjusted position by a nut 157. The upper end of the screw is threaded into a cap 158, on which is mounted a resilient button 159, in turn connected to the bottom wall 31. It will be obvious that, after the machine is installed as a unit, the height of the posts 154 may be adjusted to bring the machine into a horizontal position when the automobile is standing on a level floor. It is also to be noted that none of the components of the machine are adversely affected when the car is moving up or down grade, as they are all supported in fixed relation to each other within the casing, and with respect to the car body.

The machine M, generally considered, will be recognized as substantially self-contained, all components except the hydraulic pump and manual control elements being located within the casing. This arrangement obviously facilitates installation and reduces service costs which otherwise would be encountered. The relatively heavy elements, such as the hydraulic motor 41, compressor 42, and electric motor 75, are disposed in the central portion of the enclosing casing, with a blower and refrigerant coil on each side, thereby providing a symmetrical or balanced assembly with the weight distribution being such that there is practically no tendency to cause the car body to tilt. The condenser 43 is also located in the trunk compartment, and the usual arrangement of positioning the condenser adjacent the engine radiator is accordingly avoided. This is a significant feature, for when the condenser is located in front or in back of the radiator, serious operating difficulties may arise with both engine cooling and refrigerant condensing.

While the broad idea of utilizing a hydraulic pump and motor for operating a refrigerant compressor is recognized as not new, the circuit hereinabove described is believed to represent an improvement of technical value. Thus, the valve 81 combines in one instrument a means for bypassing the motor 41 either at the will of the operator, or if an excessive load condition should be encountered. It is not necessary to install an expensive and complicated clutch between the engine and the pump 23, nor between the motor 41 and compressor 42, to regulate the compressor operation, and thereby the intensity of the cooling effect. By returning the oil to the line 28 through a portion of the condenser 43, effective control over the oil temperature is readily obtained, without incorporating a remotely located oil cooler and a separate heat interchanger therefor.

The provision of an electric motor 75 to drive the circulated air through the evaporator 44 enables the car operator to continue air circulation without cooling, when he desires to do so, a feature of value in the winter, when the usual air heating system will be employed in preference to the cooling system. While the trend for the last year or two has been toward more elaborate car heating systems, including distribution ducts, many cars to which the present invention is applicable are not equipped with such systems. No provision has been made in the instant invention for partial recirculation of inside air with a fresh air intake, as experience has shown that the same effect can be accomplished by opening one or more of the car windows, which of course is much less expensive.

It will accordingly be understood that the present invention provides a compact unit for car cooling purposes, one which may be made at relatively low cost and may be readily installed, and one wherein the refrigerating effect is made practically independent of the car or engine speed. While the invention has been described with respect to a preferred embodiment, it will be apparent that various modifications and variations may be made without departure from its principles, as expressed by the scope of the following claims.

We claim:

1. A car air conditioning machine comprising a casing adapted to be installed in the trunk space of an automobile, a hydraulic motor and a refrigerant compressor mounted in said casing at about the central portion of said casing, a driving connection between the motor and compressor, a refrigerant condenser mounted in the casing adjacent one end thereof, a refrigerant evaporator mounted in the casing adjacent the other end thereof, bulkhead walls disposed transversely of the casing and substantially isolating the condenser and evaporator from the motor and compressor, air propelling members positioned adjacent each of said transverse walls for circulating air over the condenser and evaporator, said casing being formed with openings adjacent the condenser for drawing air from outside an automobile and returning said air after passage over the condenser to the outside, said casing being formed with other openings for drawing air from inside an automobile over the evaporator and returning said air to the inside, refrigerant connections between the compressor and condenser and evaporator for connecting the same in a closed cyclic path, a hydraulic circuit in the casing extending from a point exteriorly thereof to the hydraulic motor and from the motor to an oil cooler positioned adjacent the condenser air propelling means and from said cooler to a point exteriorly of the casing, and manually controllable means in the hydraulic circuit for substantially bypassing the hydraulic motor to govern the refrigerating effect.

2. A car air conditioning machine comprising a casing adapted to be installed in the trunk space of an automobile, a hydraulic motor and a refrigerant compressor mounted in the casing between the ends thereof, a refrigerant condenser mounted adjacent one end of the casing and a refrigerant evaporator mounted adjacent the opposite end, bulkhead walls positioned transversely of the casing and substantially isolating the condenser and evaporator from each other and from the motor and compressor, blower fan housings abutting each of said walls, blower fans mounted in the housings, said casing being formed with openings for drawing outside air over the condenser and returning said air to the outside and with other openings for drawing inside air over the evaporator and returning the inside air to the inside, a driving connection from the motor to the compressor and to the condenser blower fan, whereby said condenser fan is operated when the compressor is operated, an electric motor in the casing for driving the evaporator fan, said evaporator motor being connected for operation independently of the operation of the compressor, said compressor, condenser, and evaporator being cyclically connected to provide a refrigerant flow path, a hydraulic circuit extending from a pump disposed exteriorly of the casing to the hydraulic motor and from said hydraulic motor to a return line leading to said pump, an oil cooler disposed in said hydraulic circuit, and a selectively operable bypass valve in the hydraulic circuit for bypassing the hydraulic motor.

3. A car air conditioning machine comprising a casing adapted to be installed in the trunk space of an automobile, a hydraulic motor and a refrigerant compressor mounted in the casing adjacent the central portion thereof, a refrigerant condenser and a cooler for hydraulic fluid mounted in the casing adjacent one end thereof, a bulkhead wall positioned transversely of the casing and separating the condenser and cooler from the hydraulic motor and the compressor, a refrigerant evaporator mounted in the casing adjacent the opposite end, a second bulkhead wall positioned transverely of the casing and separating the evaporator from the hydraulic motor and the compressor, blower housings in the casing adjacent the bulkhead walls, blower fans mounted in said housings, said casing and housings being formed with openings for circulating an outside air stream over the condenser and cooler and an inside air stream over the evaporator, said compressor, condenser, and evaporator being cyclically connected in a closed refrigerant circuit, a driving connection from the hydraulic motor to the compressor, driving means for the blower fans, a hydraulic pump disposed outside of the casing, a hydraulic circuit leading from the pump to the hydraulic motor and from the motor to said cooler and thence back to the pump, said hydraulic circuit including a bypass line around the hydraulic motor and leading to said cooler, and a control valve in the bypass line operable to bypass hydraulic fluid around the hydraulic motor.

4. A car air conditioning machine comprising a casing adapted to be installed in the trunk space of an automobile, a hydraulic motor and a refrigerant compressor mounted in the casing adjacent the central portion thereof, a refrigerant condenser and a hydraulic fluid cooler mounted in the casing adjacent one end thereof, a refrigerant evaporator mounted in the casing adjacent the opposite end thereof, bulkhead walls positioned transversely of the casing and substantially isolating the condenser and the cooler and the evaporator from the hydraulic motor and the compressor, blower housings in the casing adjacent the bulkhead walls, blower fans in the housings, said casing and housings being formed with openings for an outside air stream over the condenser and cooler and an inside air stream over the evaporator, driving means for the blower fans, a driving connection from the hydraulic motor to the compressor, said compressor, condenser, and evaporator being connected cyclically in a closed refrigerant path, a hydraulic pump outside of the casing, a hydraulic circuit leading from the pump to the hydraulic motor and thence to the hydraulic fluid cooler and thence back to the pump, a pressure actuated automatic relief valve in the casing and a first bypass line including said relief valve from the pump around the hydraulic motor to the oil cooler, a manually controllable valve in the casing, and a second bypass line around the hydraulic motor including said manually controllable valve, said second bypass line also being connected to said cooler.

References Cited in the file of this patent
UNITED STATES PATENTS

| | | |
|---|---|---|
| 2,294,036 | Kettering | Aug. 25, 1942 |
| 2,480,510 | Roper | Aug. 30, 1949 |
| 2,530,241 | Harrington | Nov. 14, 1950 |